(12) United States Patent
Lee

(10) Patent No.: US 8,485,693 B2
(45) Date of Patent: Jul. 16, 2013

(54) BACKLIGHT MODULE

(75) Inventor: Keng-Yi Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 75 days.

(21) Appl. No.: 13/171,875

(22) Filed: Jun. 29, 2011

(65) Prior Publication Data

US 2012/0170312 A1  Jul. 5, 2012

(30) Foreign Application Priority Data

Dec. 31, 2010  (TW) ................................ 99147346 A

(51) Int. Cl.
*F21L 19/00* (2006.01)
*F21V 3/00* (2006.01)
*G09F 13/04* (2006.01)
*G09F 13/08* (2006.01)

(52) U.S. Cl.
USPC ........... 362/312; 362/316; 362/632; 362/812; 362/561; 362/97.1

(58) Field of Classification Search
USPC ............... 362/97.1–97.4, 312, 316, 611–614, 362/630–634, 812, 559, 561
See application file for complete search history.

(56) References Cited

U.S. PATENT DOCUMENTS

| | | | | |
|---|---|---|---|---|
| 6,942,374 | B2 * | 9/2005 | Lee | 362/615 |
| 7,916,237 | B2 * | 3/2011 | Jung et al. | 349/58 |
| 8,033,708 | B2 * | 10/2011 | Tsubaki | 362/612 |
| 8,147,113 | B2 * | 4/2012 | Hamada | 362/631 |
| 2004/0140947 | A1 * | 7/2004 | Tsuyuki et al. | 345/1.1 |
| 2007/0127270 | A1 * | 6/2007 | Chang | 362/633 |
| 2008/0174715 | A1 * | 7/2008 | Suh et al. | 349/60 |

FOREIGN PATENT DOCUMENTS

| | | |
|---|---|---|
| JP | 2001117502 A | 4/2001 |
| TW | 200736721 | 10/2007 |
| TW | M366096 | 10/2009 |
| TW | 201037409 | 10/2010 |
| TW | 201042329 | 12/2010 |

* cited by examiner

*Primary Examiner* — Evan Dzierzynski
*Assistant Examiner* — Danielle Allen
(74) *Attorney, Agent, or Firm* — WPAT, PC; Justin King

(57) ABSTRACT

A backlight module includes a chassis, a printed circuit board, a light source, and a light guide plate. The chassis includes a bottom plate and a sidewall. The sidewall is disposed on at least one side of the bottom plate. The sidewall has a recess therein. At least one part of the printed circuit board is located in the recess. The light source is electrically connected to the printed circuit board. The light incident side of the light guide plate is opposite to the light emitting side of the light source.

10 Claims, 14 Drawing Sheets

BACKLIGHT MODULE

RELATED APPLICATIONS

This application claims priority to Taiwan Application Serial Number 099147346, filed Dec. 31, 2010, which is herein incorporated by reference.

BACKGROUND

1. Technical Field

The present disclosure relates to a liquid crystal display and more particularly to a backlight module of a liquid crystal display.

2. Description of Related Art

In recent years, liquid crystal displays (LCDs) are broadly utilized in consumer electronic products or computer products because of having advantages of high displaying quality, small volume, light weight, low driving voltage, low power consumption, and widespread application, wherein the consumer electronic products or the computer products are such as portable televisions, cellular phones, notebooks, and desktop displays. Liquid crystal displays replace cathode ray tubes (CRT) gradually so as to be used more commonly.

Backlight modules are key components of liquid crystal displays. Because liquid crystal cannot emit light by itself, a typical liquid crystal display usually needs to include a backlight module. As such, people can observe displaying images with their naked eyes. Traditionally, cold cathode fluorescent lamps (CCFL) are used as a light source for a backlight module. Nevertheless, products are considered lightweight and power saving nowadays, so that people have already seen many portable electric products (e.g. cellular phones, personal digital assistants; PDA, and notebooks) with backlight modules utilizing light emitting diodes.

However, conventional white light emitting diodes would cause liquid crystal displays to provide unfavorable colors and bad color renderings. Thus, in a backlight module of a present liquid crystal display, mixed light formed from light emitting diodes with tricolor (e.g. red, green, and blue; RGB) as a backlight has become a trend.

In such backlight module utilizing the mixed light formed from light emitting diodes with tricolor, if a mixed light distance between a light incident side of a light guide plate and a display region does not reserve enough, LED mura would be displayed in the display region, thereby affecting the displaying performance of the liquid crystal display. Therefore, how to provide a sufficient mixed light distance in a backlight module has become a pressing problem for related industries to solve.

SUMMARY

An aspect of the present invention is to provide a backlight module. A sidewall of a chassis of the backlight module includes a recess therein for disposing a printed circuit board. Thus, a light source disposed on the printed circuit board and a light incident side of a light guide plate would be closer to the sidewall of the chassis, thereby a mixed light distance between the light incident side of the light guide plate and a display region would become longer so as to prevent LED mura from being displayed in the display region.

In an embodiment of the present invention, a backlight module including a chassis, a printed circuit board, a light source, and a light guide plate is provided. The chassis includes a bottom plate and a sidewall. The sidewall is disposed on at least one side of the bottom plate and includes a recess therein. At least one part of the printed circuit board is located in the recess. The light source is electrically connected to the printed circuit board. The light incident side of the light guide plate is opposite to the light emitting side of the light source.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
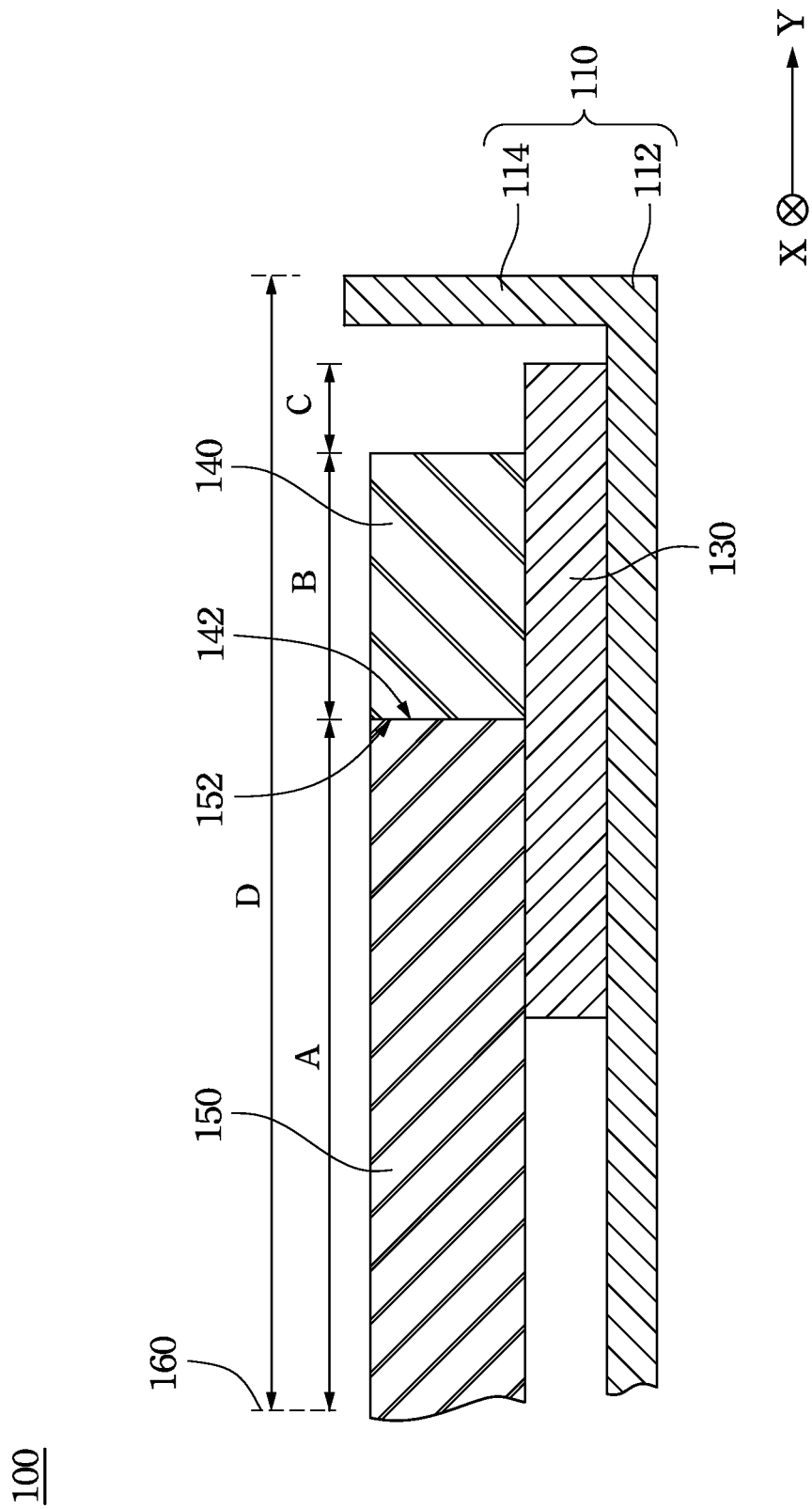
FIG. 1 is a cross-sectional view of a conventional backlight module.

FIG. 1 is a cross-sectional view of a conventional backlight module 100. As shown in FIG. 1, the conventional backlight module 100 mainly includes a chassis 110, a printed circuit board 130, a light source 140, and a light guide plate 150. The printed circuit board 130, the light source 140, and the light guide plate 150 are disposed in the chassis 110. The light source 140 is electrically connected to the printed circuit board 130. A light incident side 152 of the light guide plate 150 is opposite to a light emitting side 142 of the light source 140.

FIG. 1 shows that a mixed light distance A between the light incident side 152 of the light guide plate 150 and a display region 160 is defined by three lengths described below:

(1) A depth B of the light source 140;
(2) A distance C between the light source 140 and an edge of the printed circuit board 130; and
(3) A distance D between a sidewall 114 and the display region 160.

In general, the shorter depth B of the light source 140 is, the longer the mixed light distance A is. However, the depth B of the light source 140 is restricted to the types of the light source 140, so that manufacturers cannot modify the depth B easily.

Additionally, although the light source 140 aligned with the edge of the printed circuit board 130 (i.e. decreasing the distance C to 0) would lengthen the mixed light distance A in theory, the light source 140 aligned with the edge of the printed circuit board 130 is almost impossible to be achieved in practice. For designing, due to restriction on assembling precision, manufacturers still have to reserve the predetermined distance C between the light source 140 and the edge of the printed circuit board 130 for accommodating probable assembling errors.

As for the distance D between the sidewall 114 and the display region 160, there are two methods for lengthening the distance D generally, one is to enlarge the appearance of the liquid crystal display, and the other is to reduce the area of the display region 160. Because the two methods would degrade product competitiveness seriously, manufacturers usually do not consider lengthening the distance D to extend the mixed light distance A except necessity.

Thus, embodiments of the present invention described below are other methods for lengthening the mixed light distance A by disposing at least one part of the printed circuit board 130 in the sidewall 114 of the chassis 110. In the following detailed description would be cooperated with the drawings to provide a thorough understanding of the above mentioned.

Figure 2:
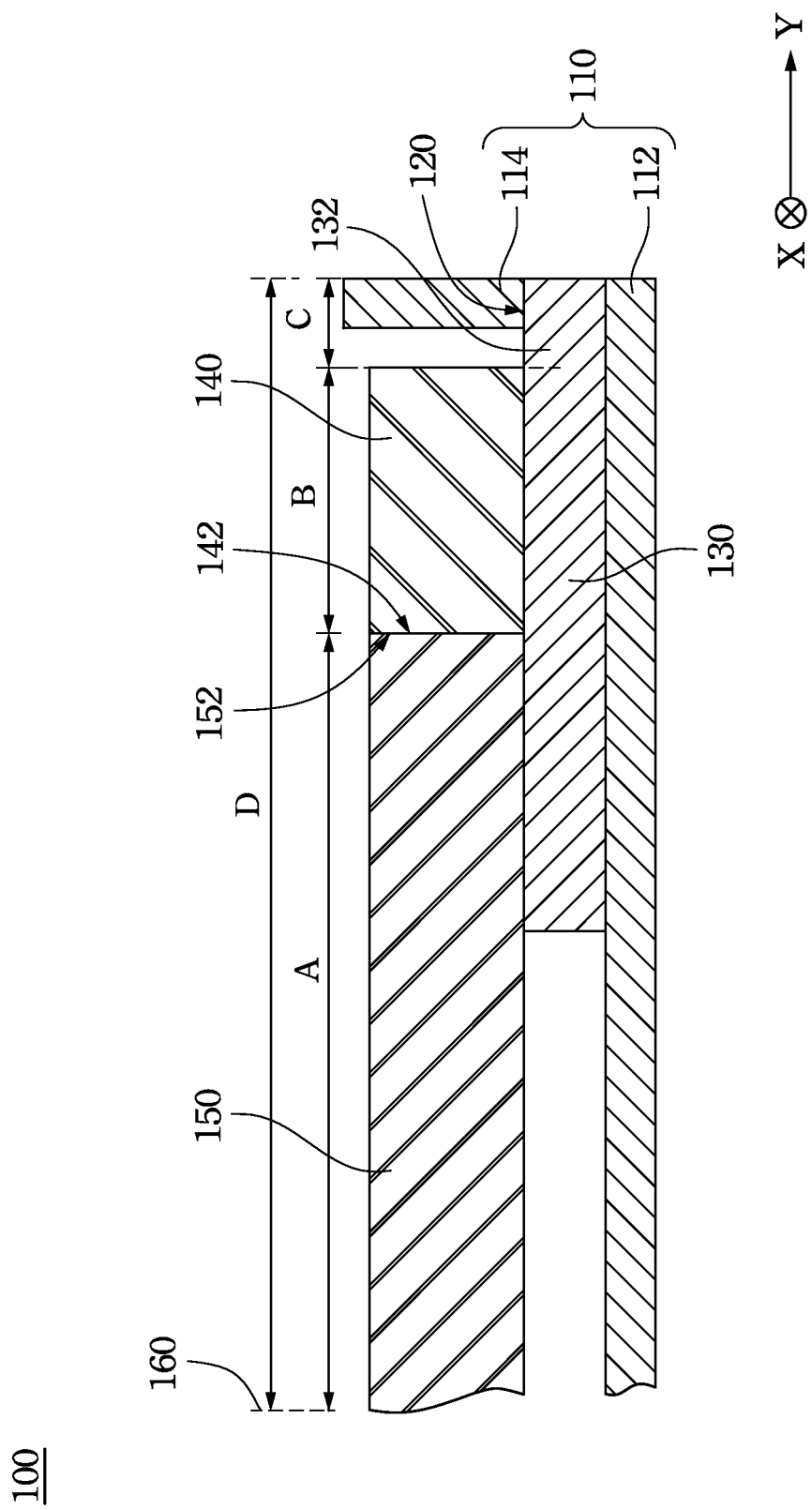
FIG. 2 is a cross-sectional view of a backlight module of an embodiment of the present invention.

FIG. 2 is a cross-sectional view of a backlight module 100 of an embodiment of the present invention. As show in FIG. 2, the backlight module 100 includes the chassis 110, the printed circuit board 130, the light source 140, and the light guide plate 150. The chassis 110 includes a bottom plate 112 and the sidewall 114. The sidewall 114 is disposed on at least one side of the bottom plate 112, and the sidewall 114 includes the recess 120 therein. At least one part of the printed circuit board 130 is located in the recess 120. The light source 140 is electrically connected to the printed circuit board 130. The light incident side 152 of the light guide plate 150 is opposite to the light emitting side 142 of the light source 140.

Comparing FIG. 1 with FIG. 2, the printed circuit board 130 and the light source 140 shown in FIG. 2 are closer to the sidewall 114 (e.g. in a direction Y) than the conventional design without the recess 120. As such, manufacturers may choose the larger light guide plate 150, thereby the light incident side 152 of the light guide plate 150 is also close to the sidewall 114 of the chassis 110. In such arrangement, the mixed light distance A between the light incident side 152 of the light guide plate 150 and the display region 160 would become longer to prevent LED mura from being displayed in the display region 160.

For manufacturing, if the chassis 110 is made of metal, the recess 120 can be formed on the sidewall 114 of the chassis 110 when manufacturing the chassis 110 by forging. Surely, if the manufacturing process is allowable, manufacturers also can manufacture the chassis 110 first by forging, and then manufacturing the recess 120 formed on the sidewall 114 of the chassis 110 by cutting.

Figure 3:
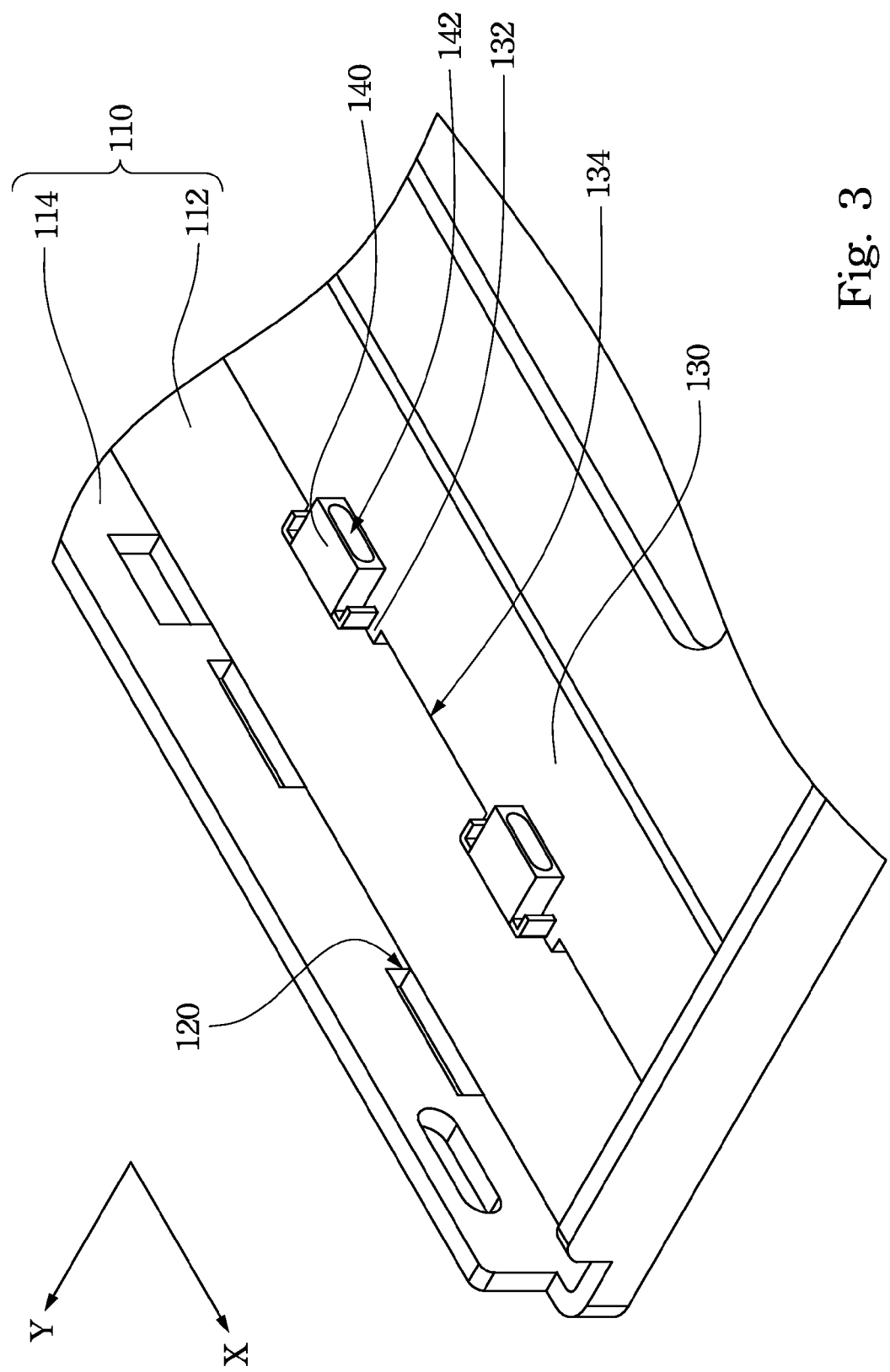
FIG. 3 is an exploded view of the chassis, the recess, the printed circuit board, and the light source shown in FIG. 2.
Figure 4:
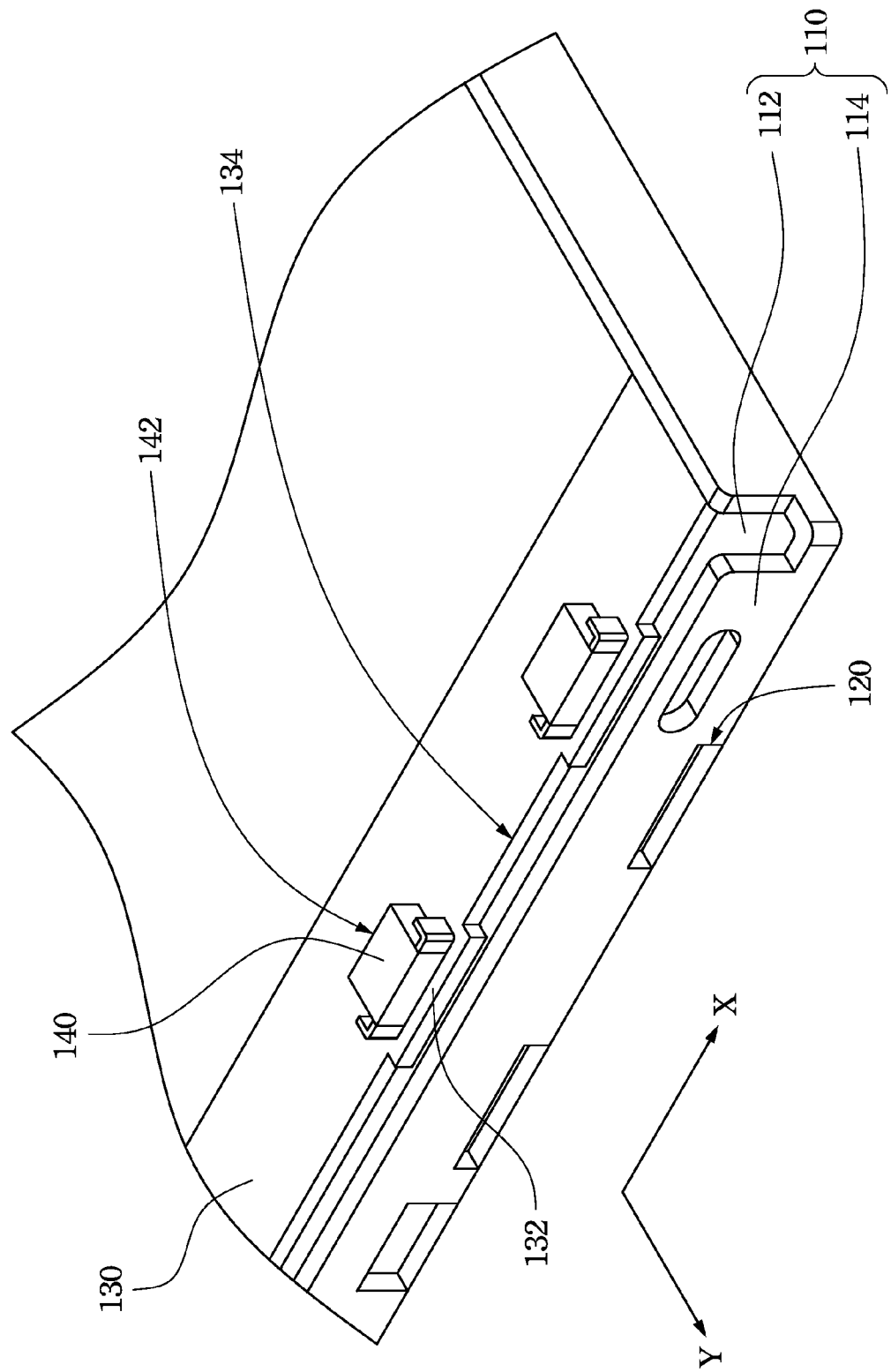
FIG. 4 is another exploded view of the chassis, the recess, the printed circuit board, and the light source shown in FIG. 3.

FIG. 3 is an exploded view of the chassis 110, the recess 120, the printed circuit board 130, and the light source 140 shown in FIG. 2. FIG. 4 is another exploded view of the chassis 110, the recess 120, the printed circuit board 130, and the light source 140 shown in FIG. 3. As shown in FIG. 3 and FIG. 4, in this embodiment, the number of the light sources 140 may be greater than two or equal to two, and the light sources 140 may be arranged on the printed circuit board 130 in different arrangements. For example, the light sources 140 may be light emitting diodes (LED) with tricolor (Red, Green, and Blue; RGB), and the light emitting diodes may be arranged RGB in sequence, arranged randomly, and arranged repeatedly in accordance with specific units (e.g. RGBBGR).

Figure 5:
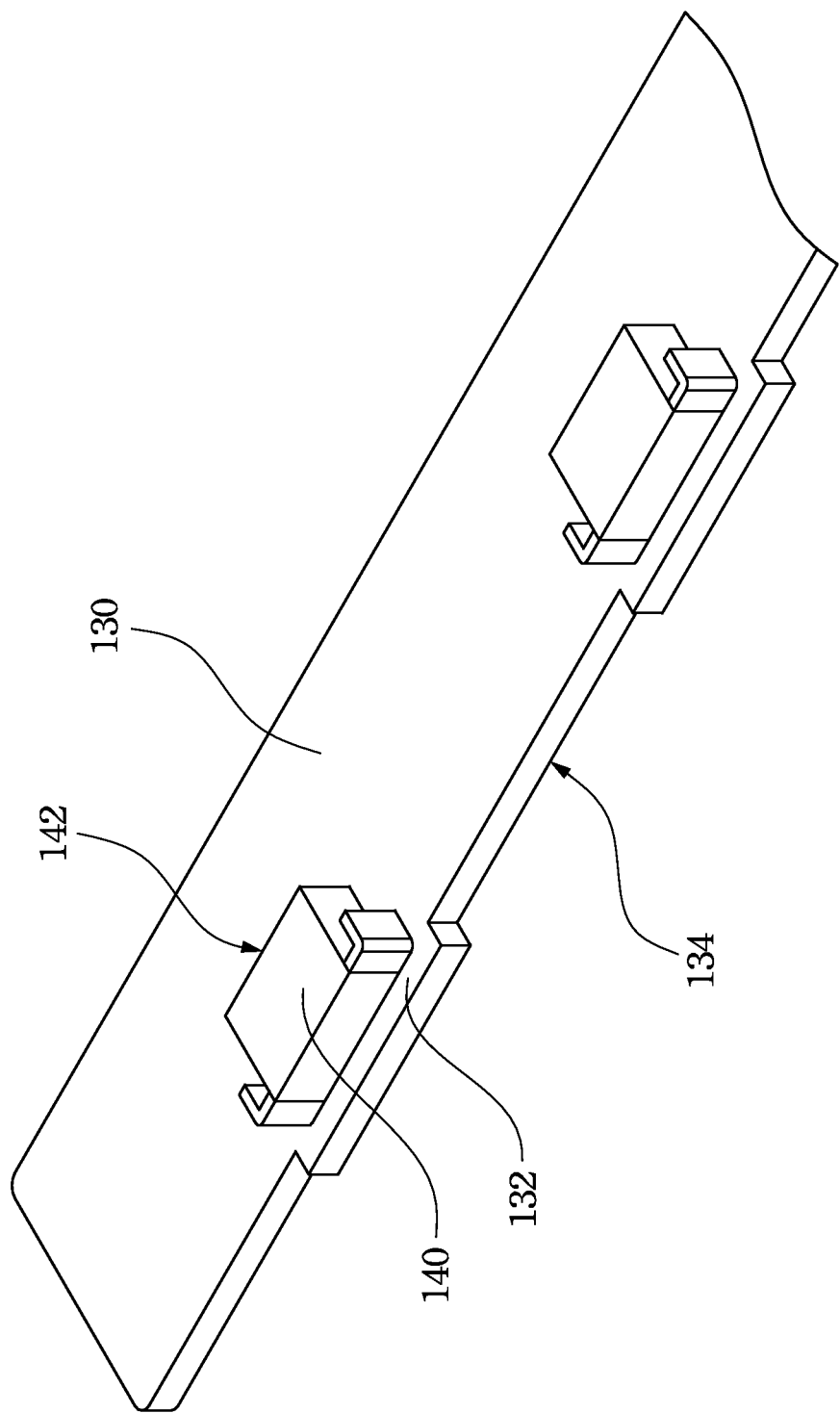
FIG. 5 is a perspective view of the printed circuit board and the light source shown in FIG. 2.
Figure 6:
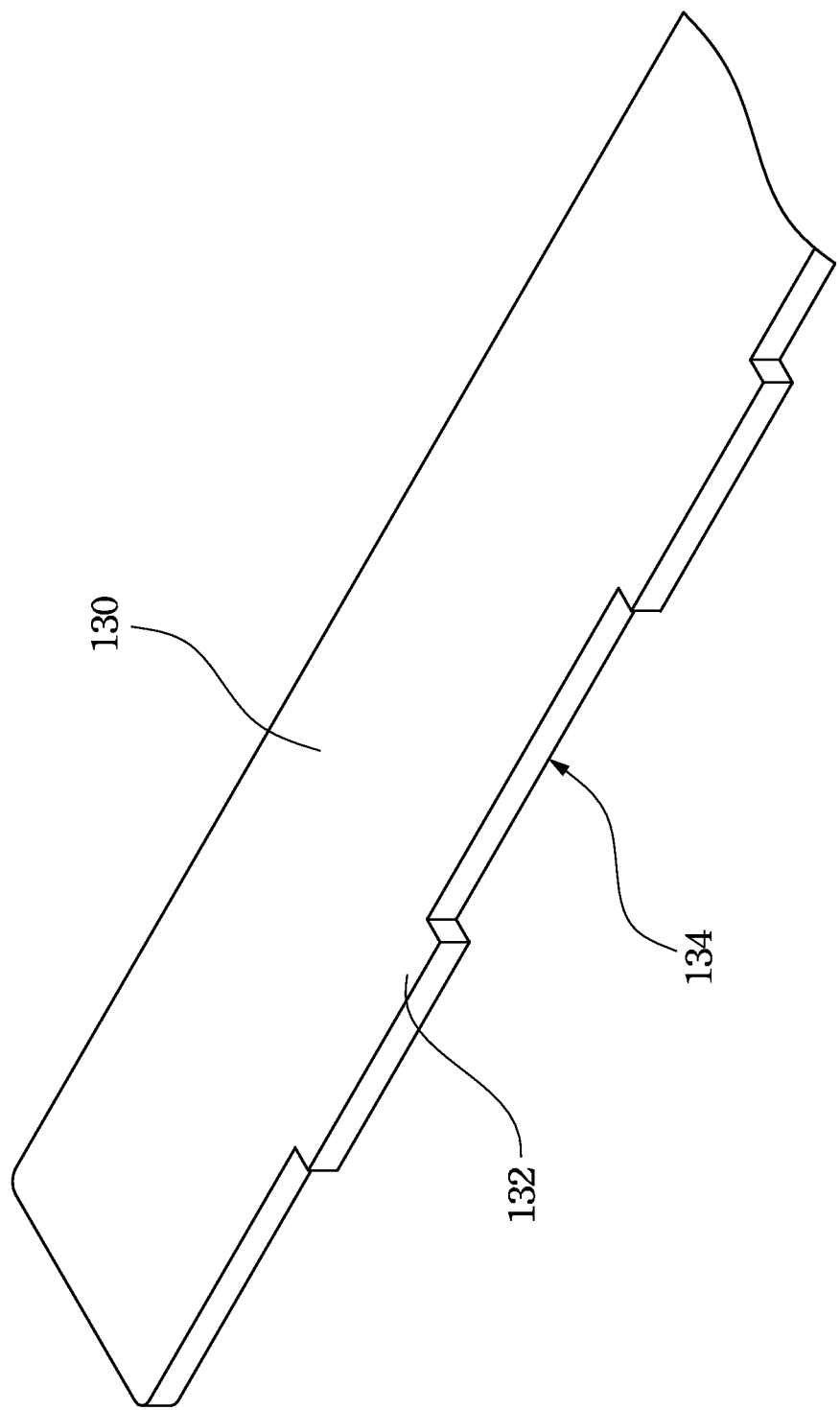
FIG. 6 is a perspective view of the printed circuit board shown in FIG. 2.

FIG. 5 is a perspective view of the printed circuit board 130 and the light source 140 shown in FIG. 2. FIG. 6 is a perspective view of the printed circuit board 130 shown in FIG. 2. As shown in FIG. 3 to FIG. 6, when the light sources 140 are arranged on the printed circuit board 130, the printed circuit board 130 may include plural protruding portions 132 corresponding to the light sources 140. The protruding portions 132 protrude toward the sidewall 114 (e.g. in the direction Y) and are aligned with the light sources 140 respectively.

As the above mentioned, because assembling errors cannot be prevented, the protruding portions 132 are reserved on the locations of the printed circuit board 130 corresponding to the light sources 140 for receiving probable assembling errors in this embodiment. As for other portions of the printed circuit board 130, because these portions are not necessary to be reserved, manufacturers can cut the portions to become concaves 134, thereby the light sources 140 would be closer to the sidewall 114 when assembling.

As shown in FIG. 3 and FIG. 4, in order to fit the type of the protruding portions 132, the number of the recesses 120 of the embodiment may be greater than two or equal to two. At least one part of the protruding portions 132 mentioned above may be located in the recesses 120 respectively, thereby the light sources 140 would be closer to the sidewall 114 of the chassis 110.

In such arrangement, the light source 140 not only would be closer to the sidewall 114 of the chassis 110, but also the combination of the protruding portion 132 and the recess 120 can limit a degree of freedom in a direction X for the printed circuit board 130 and the light source 140, thereby preventing the printed circuit board 130 and the light source 140 from separating from original design positions because of vibrations or turnovers.

Figure 7:
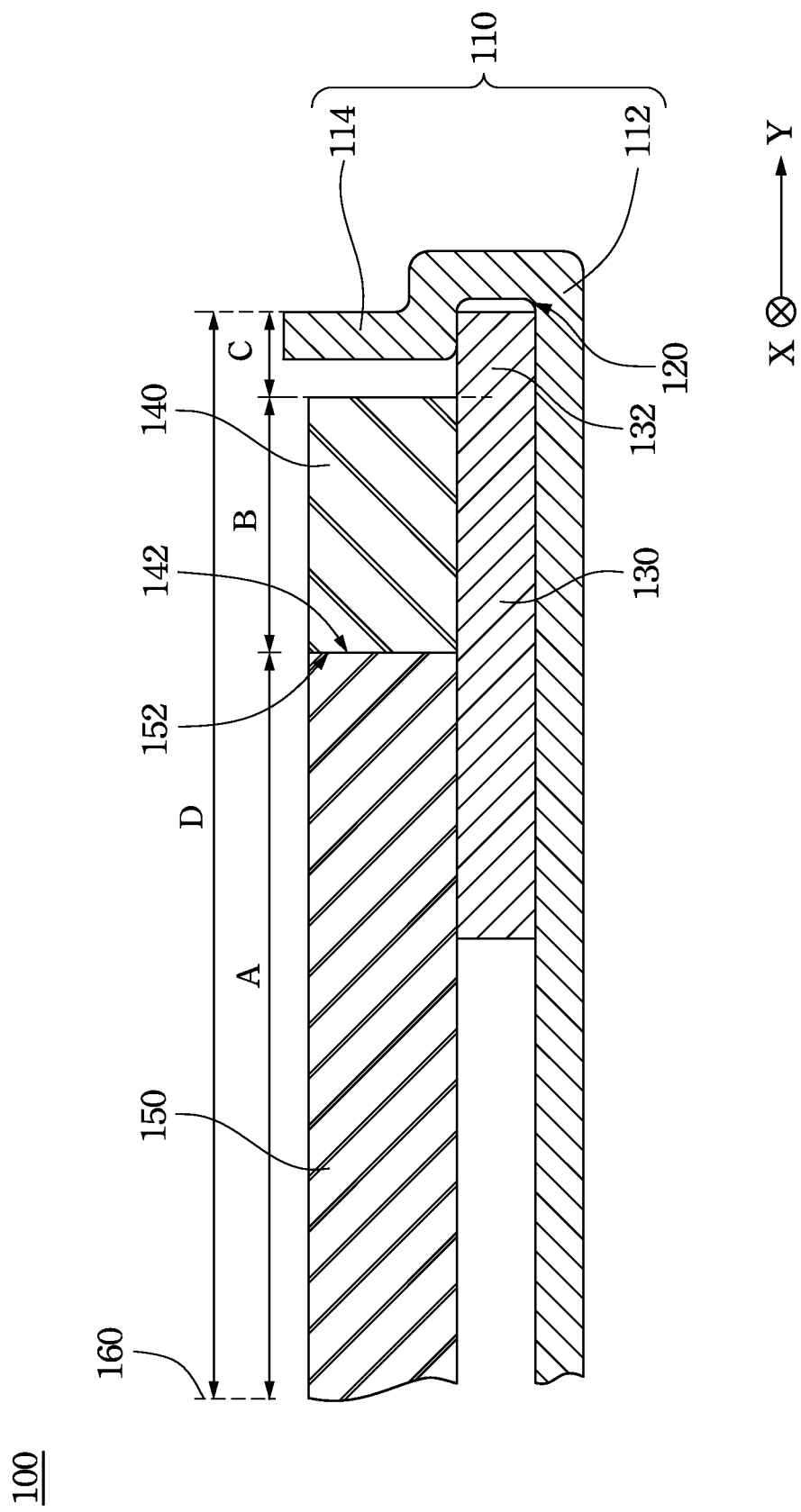
FIG. 7 is a cross-sectional view of the backlight module of another embodiment of the present invention.
Figure 8:
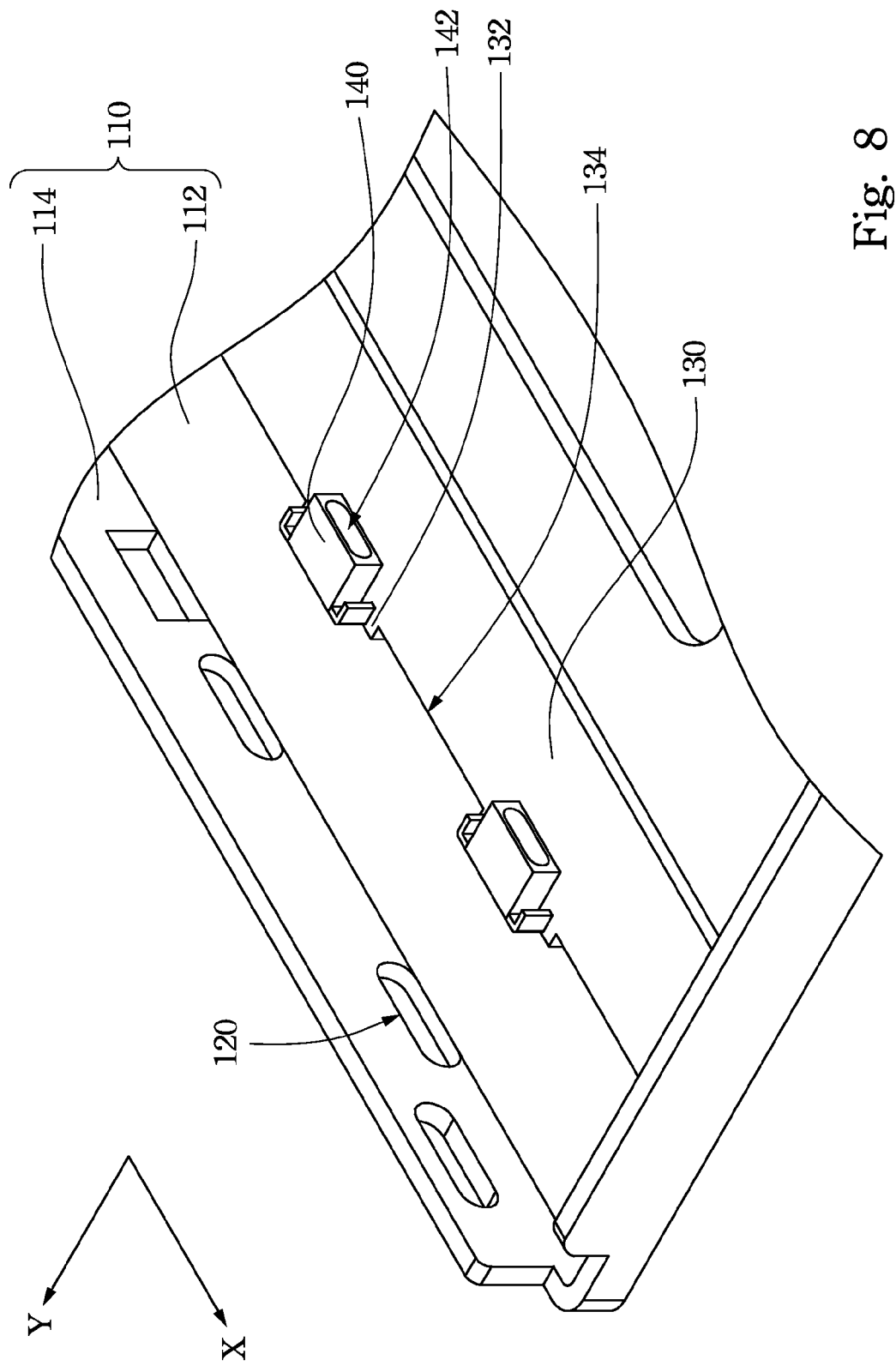
FIG. 8 is an exploded view of the chassis, the recess, the printed circuit board, and the light source shown in FIG. 7.
Figure 9:
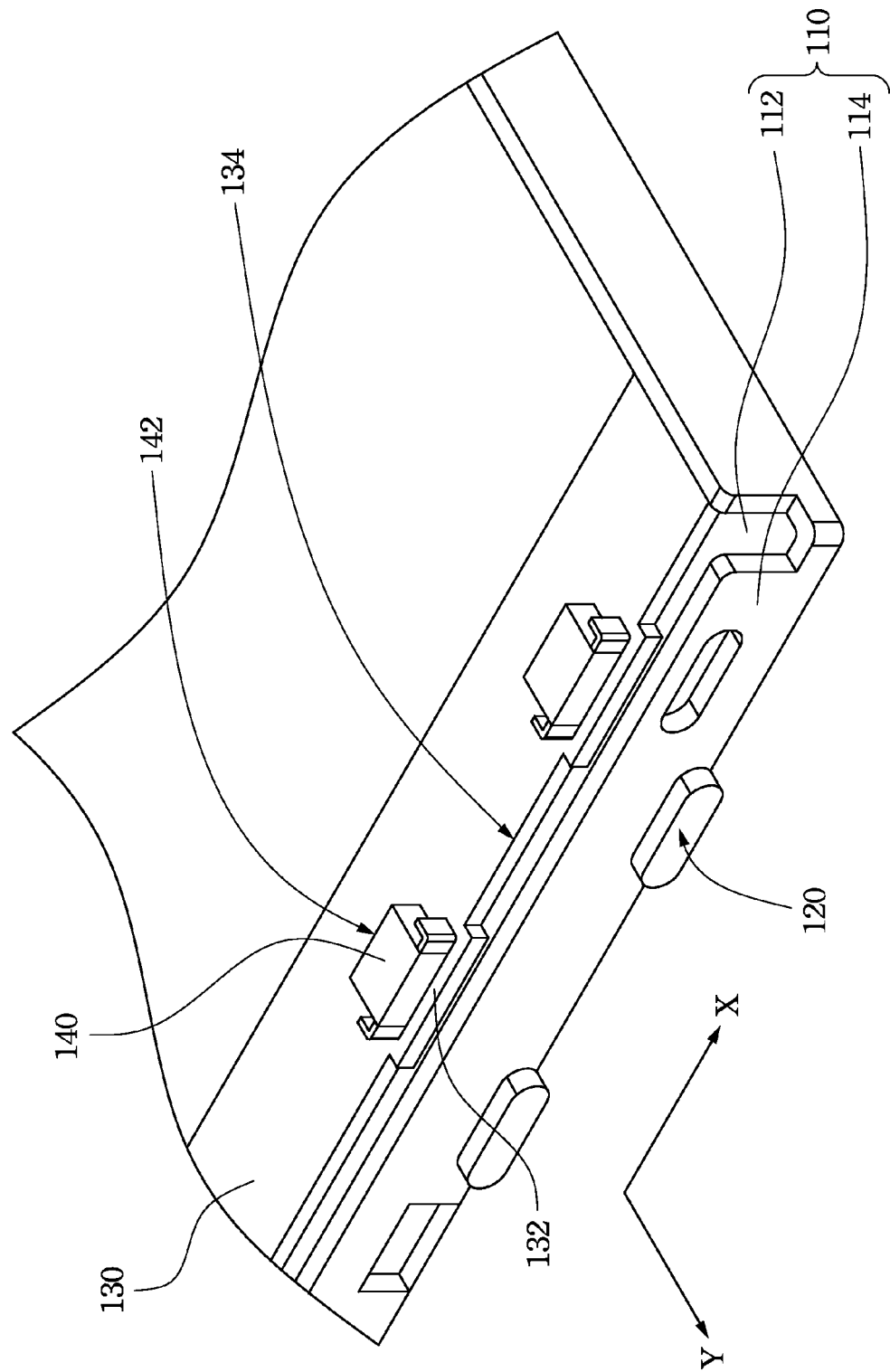
FIG. 9 is another exploded view of the chassis, the recess, the printed circuit board, and the light source shown in FIG. 8.

Although the recess 120 is illustrated as a through hole in FIG. 3 and FIG. 4, this does not limit the present disclosure. In another embodiment of the present invention, the recess 120 may also be a blind hole. As show in FIG. 7 to FIG. 9, in one or other embodiments of the present invention, the recess 120 mentioned above does not need to penetrate two opposite sides of the sidewall 114, and only need to form a concave on the sidewall 114 by forging. Person having ordinary skill in the art can selectively choose the types of the recess 120 in accordance with practical requirements.

Figure 10:
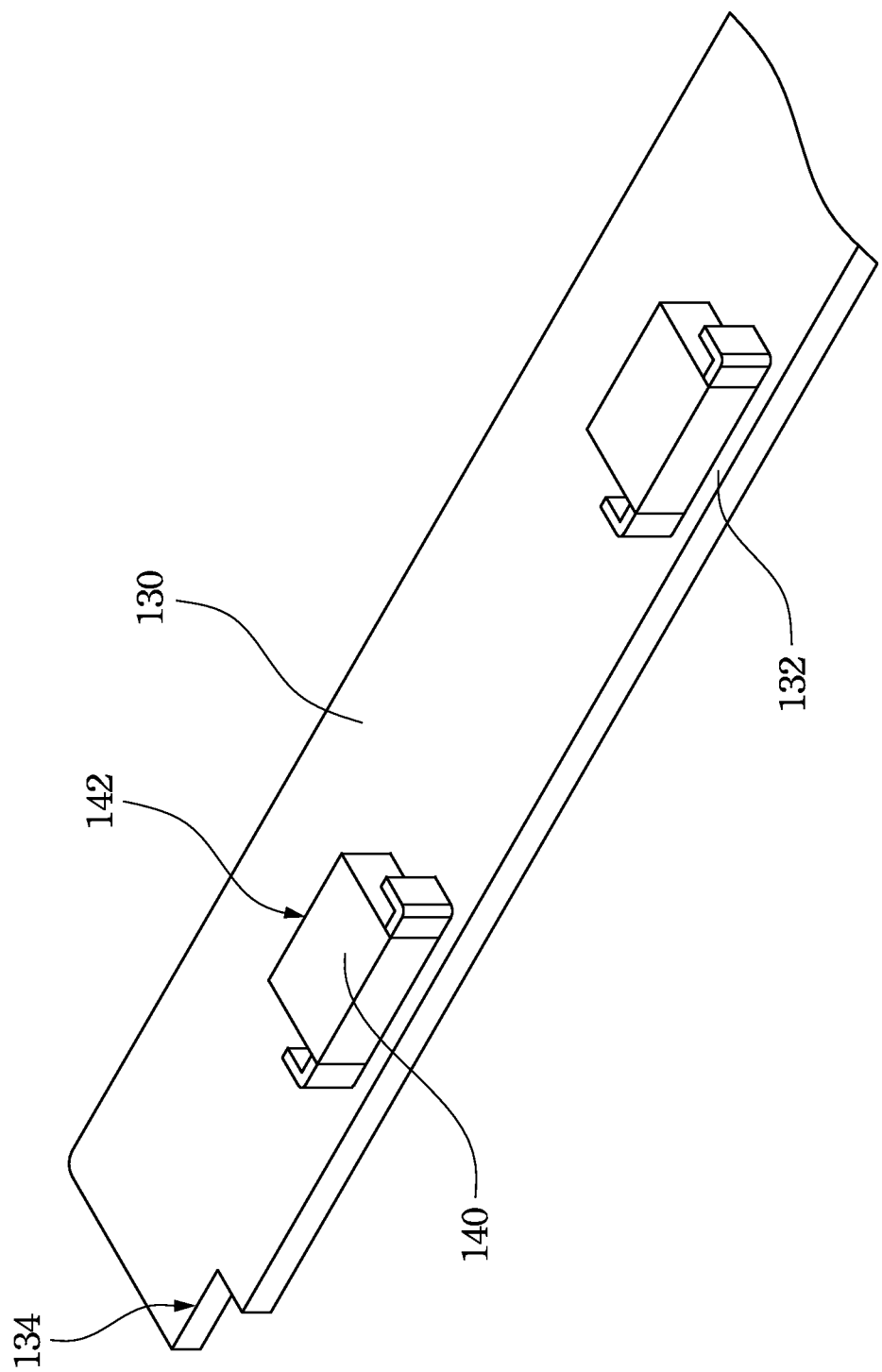
FIG. 10 is a perspective view of the printed circuit board and the light source of another embodiment of the present invention.
Figure 11:
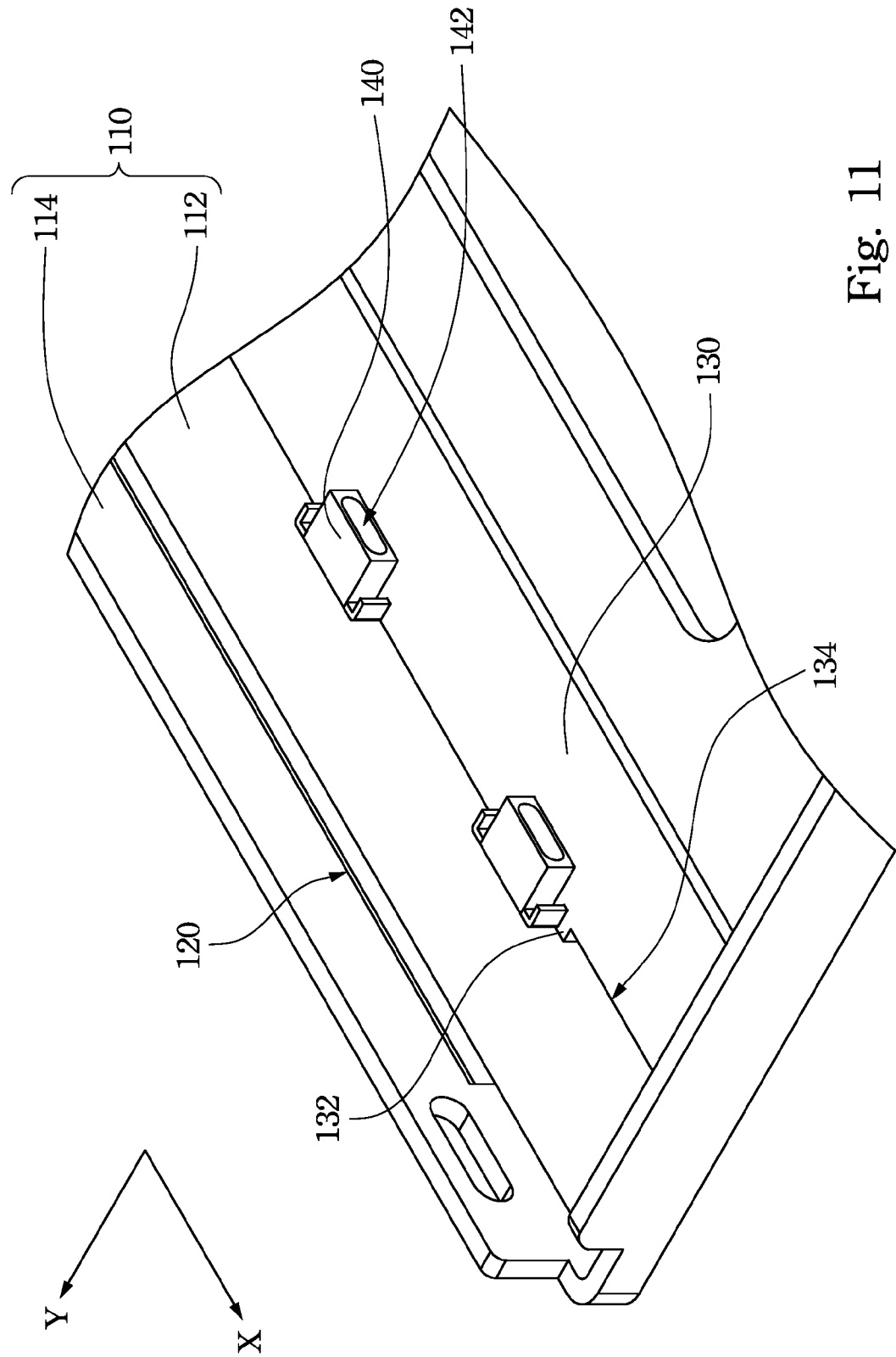
FIG. 11 is an exploded view of the chassis, the recess, the printed circuit board, and the light source of another embodiment of the present invention.
Figure 12:
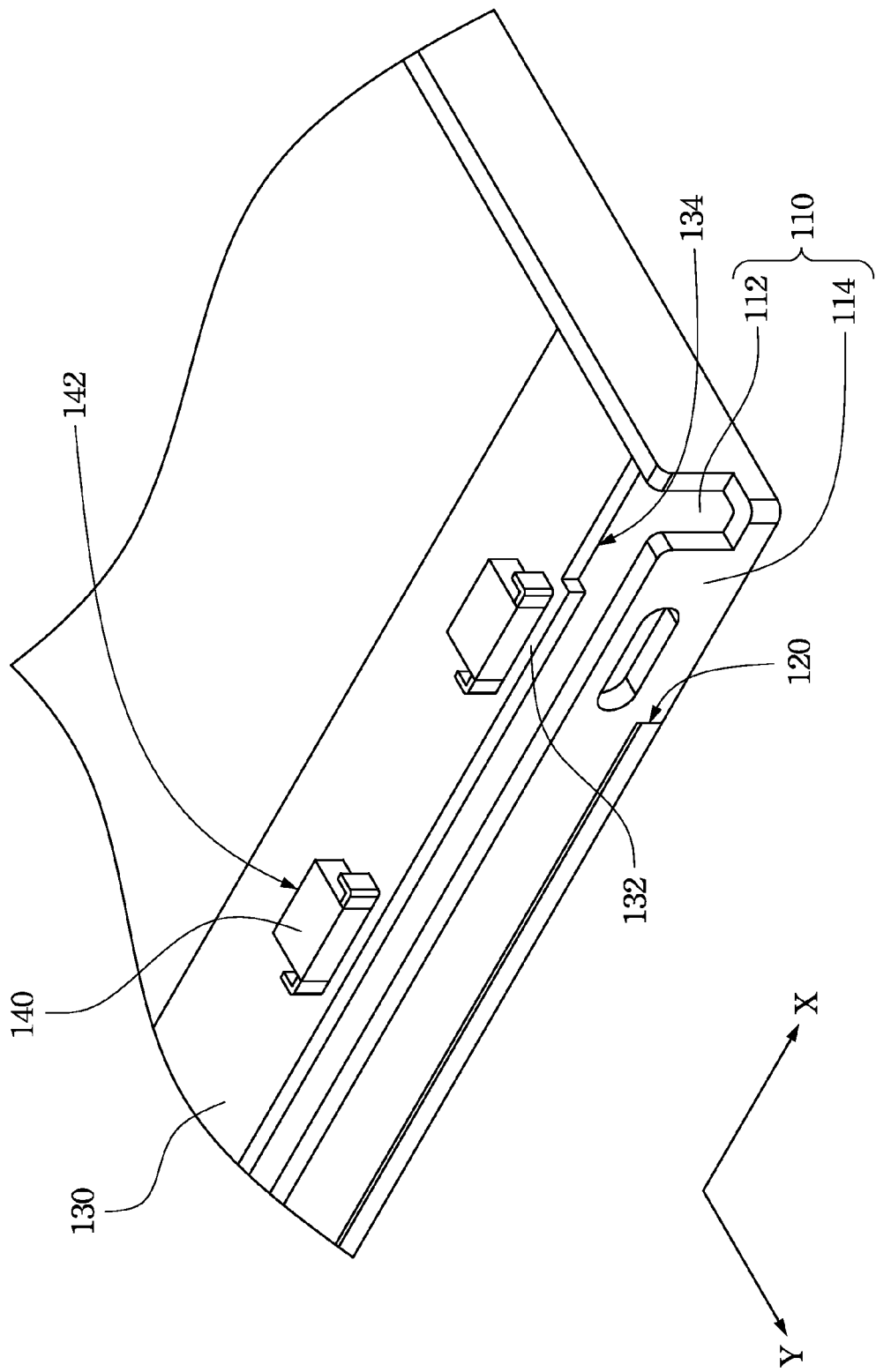
FIG. 12 is another exploded view of the chassis, the recess, the printed circuit board, and the light source shown in FIG. 11.
Figure 13:
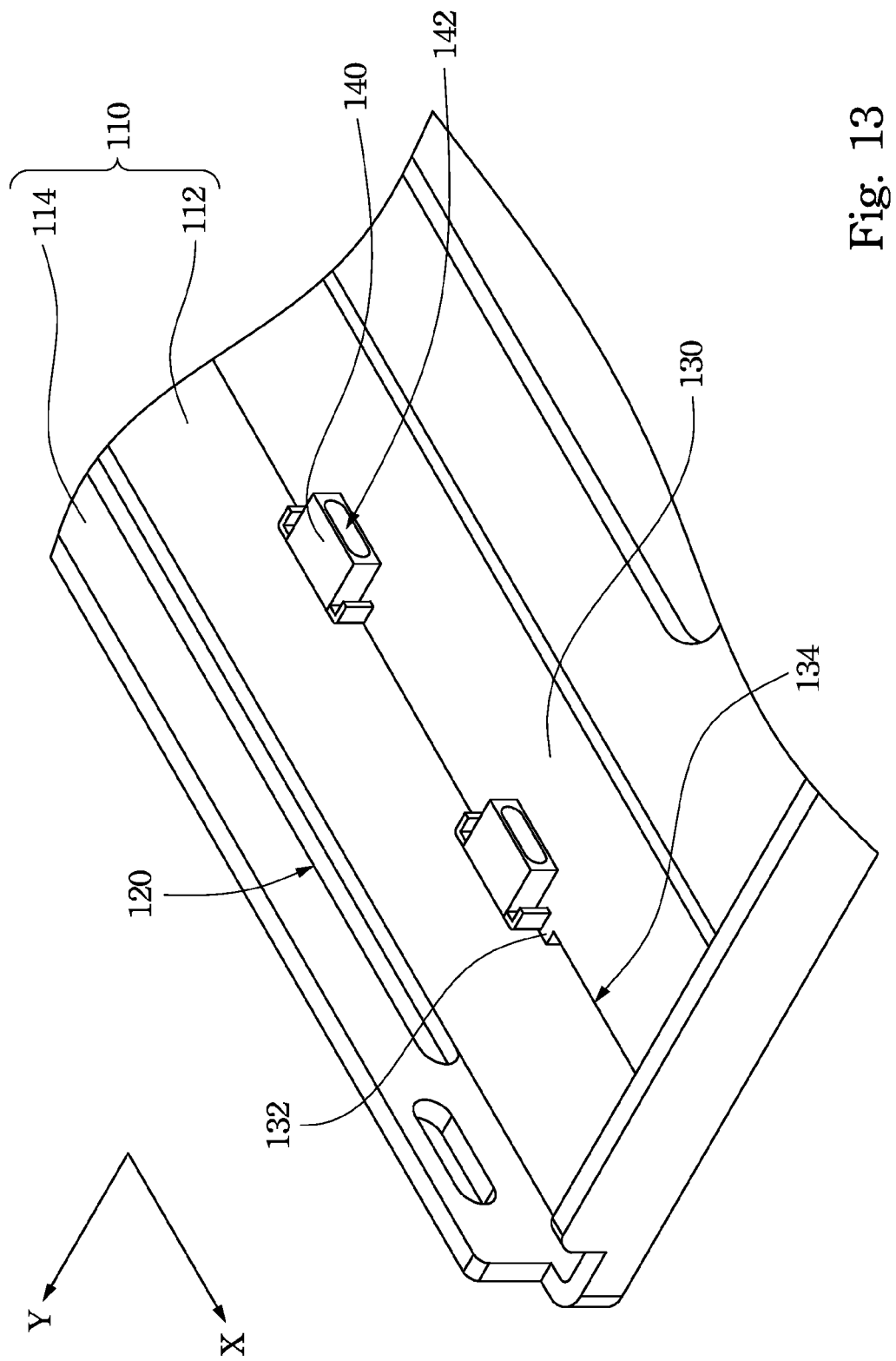
FIG. 13 is an exploded view of the chassis, the recess, the printed circuit board, and the light source of another embodiment of the present invention.
Figure 14:
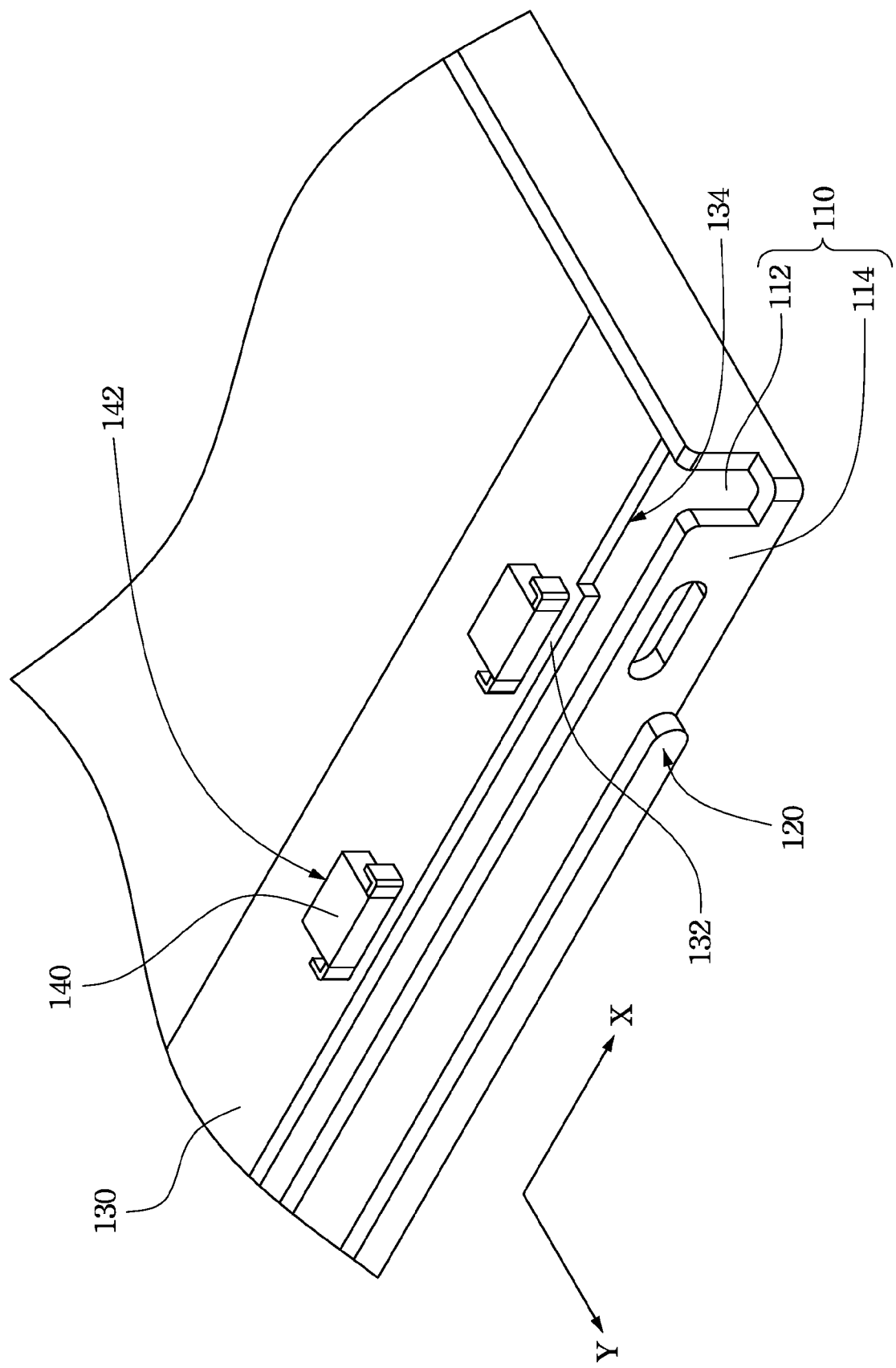
FIG. 14 is another exploded view of the chassis, the recess, the printed circuit board, and the light source shown in FIG. 13.

Certainly, if practical situation is allowable, the protruding portion 132 may be designed as a single strip shape, as shown in FIG. 10. In order to correspond to the type of the protruding portion 132, the recess 120 formed on the sidewall 114 may be a single strip-shaped through hole (shown in FIG. 11 and FIG. 12), or a single strip-shaped blind hole (shown in FIG. 13 and FIG. 14). Person having ordinary skill in the art should selectively choose the types of the protruding portion 132 and the recess 120 in accordance with practical requirements.

In the embodiments mentioned above of the present invention, the light source 140 may be a side view light-emitting diode including a lateral light emitting side. As shown in FIG. 2, the light emitting side 142 of the light source 140 may face away from the sidewall 114, and the light incident side 152 of the light guide plate 150 opposite to the light emitting side 142 of the light source 140 faces to the sidewall 114. Therefore when the protruding portion 132 of the printed circuit board 130 is disposed in the recess 120, the light emitting side 142 of the light source 140 would be close to the sidewall 114 (e.g. in the direction Y), and the light incident side 152 of the light guide plate 150 adjacent to the light emitting side 142 of the light source 140 would also be close to the sidewall 114, thereby lengthening the mixed light distance A.

In this embodiment, the printed circuit board 130 mentioned above may be a flexible printed circuit board (FPC). The light source 110 and the printed circuit board 130 of the embodiments mentioned above are only examples, not to limit the present disclosure. Person having ordinary skill in the art should selectively choose the types of the light source 140 and the printed circuit board 130 in accordance with practical requirements. For example, in other embodiments of the present invention, the printed circuit board 130 mentioned above also may be a hard printed circuit board.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A backlight module comprising:
    a chassis comprising:
        a bottom plate; and
        at least one sidewall disposed on at least one side of the bottom plate, the sidewall comprising a recess therein;
    a printed circuit board, wherein at least one part of the printed circuit board is located in the recess, and the printed circuit board comprises at least one protruding portion protruding toward the sidewall;
    at least one light source electrically connected to the printed circuit board, wherein the protruding portion is aligned with the light source; and
    a light guide plate, wherein a light incident side of the light guide plate is opposite to a light emitting side of the light source.

2. The backlight module as claimed in claim 1, wherein the recess is a through hole.

3. The backlight module as claimed in claim 1, wherein the recess is a blind hole.

4. The backlight module as claimed in claim 1, wherein the number of the light sources is greater than two or equal to two, and the light sources are arranged on the printed circuit board.

5. The backlight module as claimed in claim 4, wherein the number of the protruding portions is greater than two or equal to two, and the protruding portions are aligned with the light sources respectively.

6. The backlight module as claimed in claim 5, wherein the number of the recesses is greater than two or equal to two, and at least one part of the protruding portions is located in the recesses respectively.

7. The backlight module as claimed in claim 1, wherein the light source is a light emitting diode.

8. The backlight module as claimed in claim 1, wherein the light emitting side of the light source faces away from the sidewall.

9. The backlight module as claimed in claim 1, wherein the light incident side of the light guide plate faces to the sidewall.

10. The backlight module as claimed in claim 1, wherein the printed circuit board is a flexible printed circuit board.

\* \* \* \* \*